J. RUZICKA & F. KUBOVY.
WAGON FOR COLLECTING AND CONVEYING ASHES.
APPLICATION FILED APR. 6, 1917.

1,252,181.

Patented Jan. 1, 1918.
2 SHEETS—SHEET 1.

WITNESSES
J H Crawford
Eva W Springer

INVENTOR
Joseph Ruzicka,
Frank Kubovy,
BY Victor J. Evans
ATTORNEY

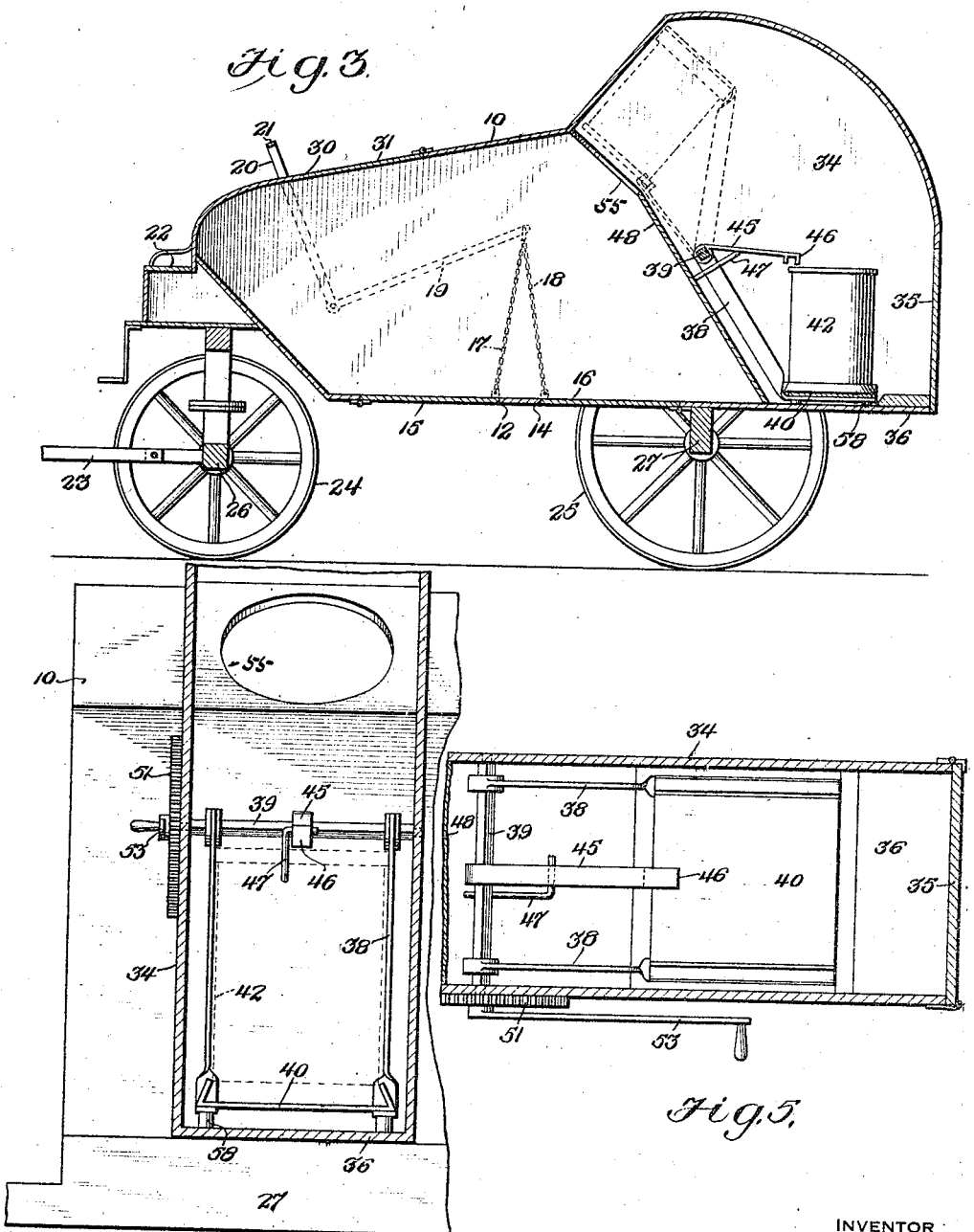

UNITED STATES PATENT OFFICE.

JOSEPH RUZICKA AND FRANK KUBOVY, OF PRINCE GEORGE COUNTY, VIRGINIA.

WAGON FOR COLLECTING AND CONVEYING ASHES.

1,252,181. Specification of Letters Patent. Patented Jan. 1, 1918.

Application filed April 6, 1917. Serial No. 160,188.

*To all whom it may concern:*

Be it known that we, JOSEPH RUZICKA and FRANK KUBOVY, respectively a citizen of the United States of America and a subject of the Czar of Russia, and residents of the county of Prince George and State of Virginia, have invented new and useful Improvements in Wagons for Collecting and Conveying Ashes, of which the following is a specification.

This invention relates to wagons for collecting and conveying ashes, and the object is to provide in a vehicle of the character specified a dust-proof receptacle, a portion of which shall be adapted for conveying the ashes when deposited therein, the remaining portion serving to house an elevating device proportioned to receive a can of usual or standard size, and to lift the can and discharge the contents thereof into the main portion of the vehicle.

In the accompanying drawings forming part of this specification;—

Fig. 3 is a view in vertical longitudinal section.

Fig. 4 is a vertical section through the chamber at the rear of the body portion of the wagon.

Fig. 5 is a horizontal section through said chamber.

Figure 1:
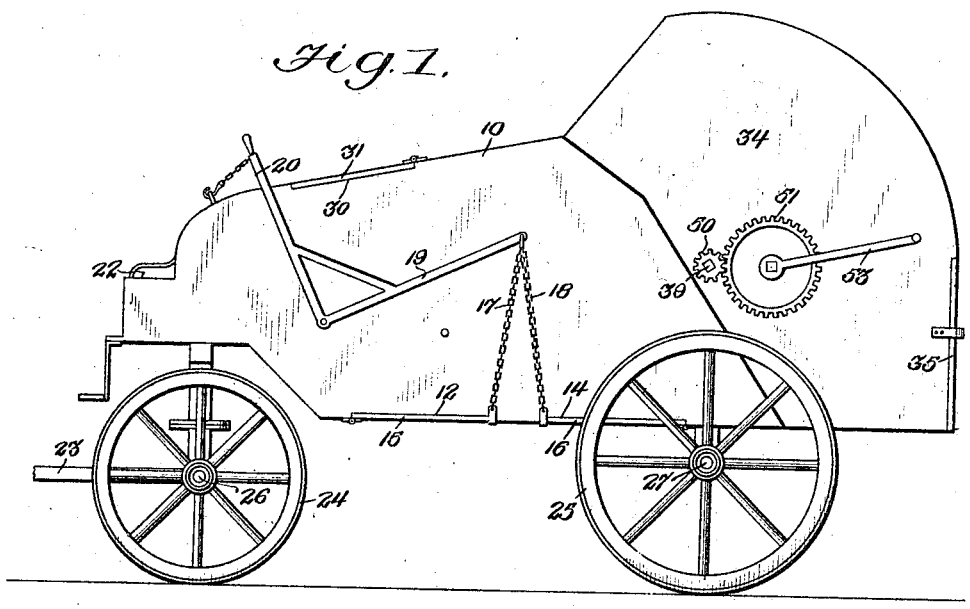
Figure 1 shows a device in side elevation.
Figure 2:
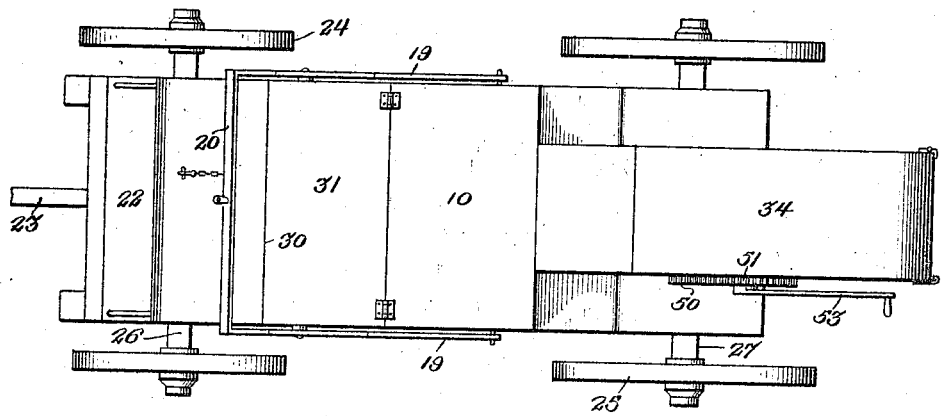
Fig. 2 is a top plan view.

Referring to the drawings in detail, the body portion of the wagon includes a main covered receptacle 10 provided with lower exit apertures 12 and 14 for the discharge of the ashes or other material when the wagon is to be unloaded. The openings 12 and 14 are closed by means of hinged doors 15 and 16 controlled by chains 17 and 18 having connection with an arm 19 of a lever 20, the lever last mentioned extending upwardly to a point within convenient reach of the driver. Lever 20 may be provided with a portion 21 extending across the top of the wagon and having connection with a lever and arm on the opposite side similar to members 20 and 19 just mentioned.

The driver's seat is shown at 22, the tongue of the wagon at 23, and certain of the wheels are designated 24 and 25. The body portion may be mounted wholly above the axles 26 and 27 when formed in the manner shown in the drawing.

The covered receptacle 10 is provided with an opening 30 covered by means of a hinged door 31 through which an implement may be inserted when it is desired to remove accumulated ashes or other material from the rear portion of the chamber 10 to the front portion thereof in the process of loading the wagon.

In the rear of covered receptacle 10 is another covered chamber 34 formed in the manner illustrated and being provided with a lower door 35 and with a bottom portion 36. The can to be emptied is inserted within the opening closed by the door 35 and said can is placed upon a lifting device prior to its elevation to the upper part of chamber 34 where it is partly inverted for the purpose of discharging the ashes.

The can elevating device comprises a plurality of arms 38 which are rigidly mounted on the transverse axle 39, these arms being connected at their lower projecting ends by a transverse plate member 40, the edges of which are upwardly and inwardly flared in order to engage a flanged portion on the bottom of the can 42. It is desirable to employ a can of the type indicated, for the reason it is not necessary to provide engaging means for the top of the can. However, as many of the cans to be emptied may not be provided with the lower rim mentioned, we have provided a device for engaging the upper edge of the can and comprising an arm 45 of resilient material having connection with transverse shaft 39 and connected with said shaft between members 38. Arm 45 is provided with a spring fork 46 for engaging the edge of the can, and a pin 47 mounted in partition member 48 of the receptacle, serves to retain the spring arm 45 in position and prevent the latter from falling below a certain point.

A pinion 50 is mounted on the outer end of axle 39 and meshes with a gear wheel 51 mounted on the outer portion of chamber 34, said gear wheel 51 being provided with a crank arm 53 for permitting the manual rotation of the gear, the pinion and the shaft 39. Upon the rotation of said shaft, the elevating device including the arms 38 and the transverse connecting member 40 will be raised within the upper portion of chamber 34 to a position for effecting the discharge of the contents of the can through an opening 55 between chambers 34 and 10.

A stop member of rubber or other material may be provided at 58 for the purpose of preventing the elevating device from coming into positive contact with the bottom 36 of chamber 34.

In the use of the device, it will be observed that it is only necessary to place the can in an upright position within the lower portion of chamber 34, which is within convenient reach from the ground, obviating the necessity of elevating the can to an inconvenient height and thereby saving considerable time when a large number of cans are to be handled. In view of the fact that chambers 34 and 10 may be entirely closed, the dust, incident to the dumping of the can, can not be distributed in the vicinity and all inconvenience resulting from this cause will be avoided. It is of course the intention that doors 31 and 35 shall be closed during the dumping operation.

What is claimed is:—

1. In a device of the class described, a wagon including a plurality of chambers, one of which constitutes a receiving chamber, means for closing both of said chambers to prevent the escape of material therefrom, an elevating device mounted within the receiving chamber and including a transverse shaft, a plurality of arms rigidly connected with said shaft, a plate member for connecting the lower ends of the arms to form an open end platform, upwardly and inwardly turned flanges carried by the sides of the plate, and means for rotating said shaft and elevating the can through the arc of a circle to discharge position in the upper part of said receiving chamber.

2. In a device of the class described, a wagon provided with a dust-proof receiving chamber, an elevating device mounted within said chamber and comprising a plurality of arms, a plate member having an unobstructed rear edge connecting said arms at their lower ends, flanges upwardly and inwardly turned and formed on the sides of the plate, a receptacle having a flanged portion on the base thereof, engaging the flanges first named, a shaft for rigidly mounting said arms, a pinion carried by the shaft, a gear wheel meshing with the pinion and means for rotating said gear wheel.

In testimony whereof we affix our signatures.

JOSEPH RUZICKA.
FRANK KUBOVY.